(12) United States Patent
Yang et al.

(10) Patent No.: US 12,345,412 B2
(45) Date of Patent: Jul. 1, 2025

(54) APPARATUS AND METHOD OF REMOVING FOREIGN SUBSTANCES FROM STEAM GENERATOR

(71) Applicants: DOOSAN ENERBILITY CO., LTD., Changwon (KR); Sun Engineering Co., Ltd., Gwangju (KR)

(72) Inventors: Sung Kyu Yang, Gimhae (KR); Deok Il Kim, Changwon (KR); Ki Deok Seong, Changwon (KR); Hyeon Hui Park, Gwangju (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 435 days.

(21) Appl. No.: 18/052,547

(22) Filed: Nov. 3, 2022

(65) Prior Publication Data

US 2023/0138837 A1 May 4, 2023

(30) Foreign Application Priority Data

Nov. 4, 2021 (KR) .......................... 10-2021-0150444

(51) Int. Cl.
*F22B 37/48* (2006.01)
*B08B 9/023* (2006.01)
(Continued)

(52) U.S. Cl.
CPC ............ *F22B 37/483* (2013.01); *B08B 9/023* (2013.01); *B08B 13/00* (2013.01); *F28G 15/003* (2013.01);
(Continued)

(58) Field of Classification Search
CPC ...... F22B 37/48; F22B 37/483; F22B 37/003; F22B 37/005; F22B 37/486; F22B 37/53;
(Continued)

(56) References Cited

U.S. PATENT DOCUMENTS 4,718,377 A * 1/1988 Haller .................. B23P 19/022
165/11.2
5,061,176 A * 10/1991 Zafred .................. F22B 37/003
432/5

(Continued)

FOREIGN PATENT DOCUMENTS

KR 10-0362055 B1 3/2003
KR 20-0420038 Y1 7/2006
(Continued)

*Primary Examiner* — Gregory A Wilson
(74) *Attorney, Agent, or Firm* — Harvest IP Law, LLP

(57) ABSTRACT

An apparatus for removing foreign substances around a heating tube of a steam generator is proposed. The apparatus includes a universal machine unit configured to hold the foreign substances, a connecting rod unit including a distal end connecting rod and a connecting rod part, a connecting rod moving unit configured to supply the connecting rod unit into the heating tube to move the connecting rod unit, a connecting rod supply unit provided to sequentially supply the plurality of connecting rods to the connecting rod moving unit, an image-capturing unit configured to be moved to a point where the foreign substances are located to capture an image of the foreign substances, and a controller connected to the universal machine unit, the connecting rod moving unit, and the connecting rod supply unit to control operations thereof.

20 Claims, 12 Drawing Sheets

(51) Int. Cl.
  *B08B 13/00* (2006.01)
  *F28G 15/00* (2006.01)
  *F28G 15/04* (2006.01)
  *G21D 5/08* (2006.01)

(52) U.S. Cl.
  CPC .......... *F28G 15/04* (2013.01); *B08B 2209/02* (2013.01); *G21D 5/08* (2013.01)

(58) Field of Classification Search
  CPC .......... F22B 37/54; F28G 15/08; F28G 15/04; F28G 1/04; B08B 13/00; G21C 17/017
  See application file for complete search history.

(56) References Cited

U.S. PATENT DOCUMENTS

| | | | | |
|---|---|---|---|---|
| 5,100,610 | A * | 3/1992 | Pirl | F28F 11/02 376/310 |
| 5,178,822 | A * | 1/1993 | Buford, III | F22B 37/483 122/504 |
| 8,485,139 | B2 * | 7/2013 | Kim | F28G 15/04 165/95 |
| 8,953,735 | B2 * | 2/2015 | Hu | F22B 37/483 376/347 |

FOREIGN PATENT DOCUMENTS

| | | | |
|---|---|---|---|
| KR | 20150107820 A | * | 9/2015 |
| KR | 20180090067 A | * | 8/2018 |

* cited by examiner

APPARATUS AND METHOD OF REMOVING FOREIGN SUBSTANCES FROM STEAM GENERATOR

CROSS REFERENCE TO RELATED APPLICATION

The present application claims priority to Korean Patent Application No. 10-2021-0150444, filed on Nov. 4, 2021, the entire contents of which are incorporated herein for all purposes by this reference.

BACKGROUND OF THE INVENTION

1. Field of the Invention

The present disclosure relates to an apparatus and method of removing foreign substances from a steam generator and, more particularly, to an apparatus for removing foreign substances located on a bundle of heating tubes of a steam generator used in a nuclear power plant, and a method of removing foreign substances located on a bundle of heating tubes using the same.

2. Description of the Background Art

Referring to the Background art described in Korean Patent Registration No. 10-1086344, in general, a steam generator in a nuclear power plant is one of the most important facilities for generating steam required to produce electric power from a steam turbine and a power generator.

Specifically, a plurality of heating tubes formed in a bundle are disposed in the steam generator. The heating tube provides a heat exchange function between primary system water containing radioactivity and secondary system water turning a turbine, and serves to separate the primary system water and the secondary system water from each other.

Steam is generated as follows. The primary system water heated while passing through a nuclear reactor flows through a path in the heating tube of the steam generator. The secondary system water supplied to the outside of the heating tube comes into contact with an external wall of the heating tube. Thus, heat exchange is performed between the primary system water and the secondary system water through a tube wall of the heating tube. Then, the primary system water flows back toward the nuclear reactor through a path of a closed circuit, and circulates through the nuclear reactor, and the secondary system water is converted to steam.

That is, radioactive water (i.e., the primary system water) with high temperature and pressure flows through the inside of the heating tube, and nonradioactive water (i.e., the secondary system water) flows around the outside of the heating tube, with a wall of the heating tube disposed therebetween. Thus, if the heating tube is damaged, the radioactive water (i.e., the primary system water) flowing through the heating tube may leak out of the heating tube and be mixed with the nonradioactive water (i.e., the secondary system water) and may generate a radioactively contaminated mixed water. Thus, radioactive contamination may occur throughout a space to which steam converted from the nonradioactive water (i.e., the secondary system water) is provided. Accordingly, it is most important to ensure sealing reliability of heating tubes in various operations in a nuclear power plant.

FIG. 1 is a cross-sectional view illustrating a conventional steam generator, FIG. 2 is a front cross-sectional view illustrating the steam generator of FIG. 1, and FIG. 3 is a cross-sectional view schematically illustrating an operational principle of the steam generator. Referring to these drawings, the steam generator 10 includes an inlet nozzle 1 into which primary system water flows, a heating tube 3 into which the primary system water fed through the inlet nozzle 1 flows and is heat-exchanged with secondary system water introduced into the steam generator, and an outlet nozzle 5 out of which the primary system water heat-exchanged with the secondary system water in the heating tube is discharged toward a nuclear reactor. The heating tube 3 is mounted on a tube sheet 4 so as to be supported by tube support plates 6 at regular vertical intervals. A flow distribution baffle 8 shaped like a doughnut plate is installed between the lowest tube support plate 6 and the tube sheet 4 so as to support the heating tube 3. The heating tube 3, and the tube support plates 6 arranged at regular vertical intervals to support the heating tube are disposed on the inner side of a wrapper 20 having an open lower portion and an upper portion with a steam outlet 21. Water is supplied into the lower portion of the wrapper 20, and is heated into a steam by the heating tube and then is discharged upwards.

The steam generator having the above-described structure generates steam as follows: the primary system water flows through the inlet nozzle 1 in the heating tubes 3 so that heat is transferred to the secondary system water fed to the outside of the heating tubes 3, thereby generating steam.

A portion of the steam generator 10 where a reactor coolant flows is referred to as a primary side, and a portion of the steam generator 10 where water is fed and steam flows is referred to as a secondary side. The secondary side of the steam generator includes a main steam system, a turbine system, a condensate water system, and a feed-water system.

Thus, steam generated by the secondary side of the steam generator 10 flows through a main steam tube to turn a turbine.

The conventional steam generator has a structure in which several thousands of U-shaped heating tubes 3 are disposed in a bundle type such that both ends thereof are fixed to the tube sheet 4 and the heating tubes 3 are supported by the tube support plates 6 that are vertically arranged in seven stages at an interval of about 1 m up to an upper portion of the bundle of heating tubes 3, as illustrated in FIGS. 2 and 3. However, as the number of years of operation passes, impurities introduced or generated through various routes become scale on the outer surface of the heat transfer tubes 3 to degrade a heat exchange function, and are deposited as sludge between the heating tubes 3 and the tube support plates 6 and are gradually solidified, which may cause denting between the support plates 6 and the heating tubes 3 to damage the heating tubes 3. Accordingly, it is necessary to remove scale stuck to the surface of the heating tubes 3, sludge deposited on the tube support plates 6, and foreign substances provided between the heating tubes in order to ensure efficiency of the steam generator and operational reliability of the heating tubes 3.

Existing inspection and removal of foreign substances in the steam generator was performed by checking the presence or absence of foreign substances in a gap between the top of the tube sheet and the bundle of heating tubes 3 and, if there were any foreign substances, removing them. However, there is a problem in that when foreign substances are located on the upper portion of the bundle of heating tubes (tube support plate: top of full egg-crate), it is impossible to check and remove foreign substances with the existing technology.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide an apparatus and method of removing foreign substances located on an upper portion of a bundle of heating tubes in a steam generator, which cannot be otherwise removed by conventional removal configurations.

According to an aspect of the present disclosure, there is provided an apparatus for removing foreign substances around a heating tube of a steam generator, the apparatus including: a universal machine unit configured to be inserted into, moved along, and discharged out of the heating tube through an opening formed in the heating tube so as to hold the foreign substances; a connecting rod unit including a distal end connecting rod to which the universal machine unit is connected at one end of the distal end connecting rod and which is inserted into and moved along the heating tube so as to move the universal machine unit, and a connecting rod part to which a plurality of connecting rods are connected and which is connected to the distal end connecting rod; a connecting rod moving unit configured to supply the connecting rod unit from the outside to the inside of the heating tube so as to move the connecting rod unit; a connecting rod supply unit provided adjacent to the connecting rod moving unit to sequentially supply the plurality of connecting rods to the connecting rod moving unit; an image-capturing unit configured to be moved to a point where the foreign substances are located through the heating tube to capture an image of the foreign substances to allow a user to check the position of the foreign substances and the approach of the universal machine unit to the foreign substances; and a controller connected to the universal machine unit, the connecting rod moving unit, and the connecting rod supply unit to control operations of the universal machine unit, the connecting rod moving unit, and the connecting rod supply unit.

The universal machine unit may include: a first universal machine mounted on the distal end connecting rod positioned at a distal end of the connecting rod unit supplied into the heating tube; and a second universal machine connected to the first universal machine and configured to be moved out of the heating tube through the opening formed in the heating tube so as to hold the foreign substances around the heating pipe.

The first universal machine may include: a first mounting body having, at one end thereof, a mounting end mounted on the distal end connecting rod to protrude therefrom; a first servomotor provided in the first mounting body and connected to the controller; a first planetary gear reducer connected to the first servomotor via a rotating shaft; a first worm gear connected to the first planetary gear reducer; and a first rotating finger connected to the first worm gear to rotate up and down by the operation of the first worm gear, and connected to the second universal machine, wherein both ends of the distal end connecting rod are respectively provided with a connecting end, to which the mounting end is connected, and a connector end recess, in a protruding manner, a connector end protrusion is connected to the connector end recess, the connector end protrusion protruding from one end of the connecting rod to which the end connecting rod is connected, and a connector end recess, to which the connector end protrusion is connected, is provided to protrude from the other end of the connecting rod.

The second universal machine may include: a second mounting body having a connecting end protruding outward from one end of the second mounting body so as to be connected to the first rotating finger, and a holding end protruding outward from the other end; a second servomotor provided on one end side of the second mounting body and connected to the controller; a second planetary gear reducer connected to the second servomotor via a rotating shaft; a second worm gear connected to the second planetary gear reducer; and a second rotating finger connected to the second worm gear to rotate up and down by the operation of the second worm gear, and operated in association with the holding end to hold the foreign substances.

The connecting rod moving unit may include: a first support frame mounted on a tube sheet of the steam generator and having a through-hole through which the connecting rod passes; a second support frame provided to be spaced apart from the first support frame; a plurality of connecting frames connecting the first support frame and the second support frame; a vertical lifting body provided to be moved up and down between the first support frame and the second support frame and having a fastening member to fasten the connecting rod supplied from the connecting rod supply unit; a guide rod provided between the first support frame and the second support frame to be connected to the lifting body so as to guide the movement of the lifting body; and a lifting body moving part mounted on the second support frame to be connected to the lifting body so as to move up and down the lifting body from the guide rod.

The second support frame may be provided with a through-hole through which the lifting body moving part passes, the lifting body moving part including: a hydraulic rod connected to the lifting body to move up and down the lifting body during sliding movement thereof; and a hydraulic motor connected to an end of the hydraulic rod to provide power to move the hydraulic rod.

The connecting rod supply unit may include: a connecting rod storage rotatably provided in the connecting rod moving unit to store a plurality of connecting rods, and having a plurality of seating recesses spaced apart from each other such that the stored connecting rods are seated therein; a storage-rotary motor connected to the connecting rod storage to provide power to rotate the connecting rod storage in a circumferential direction; a connecting rod supply provided inside the connecting rod storage to rotate and move the connecting rod seated in the plurality of seating recesses to a connecting rod insertion point of the connecting rod moving unit; a supply-rotary motor connected to the connecting rod supply to rotate the connecting rod supply in the circumferential direction of the connecting rod storage; and a mounting frame provided to be spaced apart from the connecting rod storage and connected to the connecting rod moving unit and having a mounting recess provided to mount the connecting rod moved in the connecting rod storage on the connecting rod insertion point, wherein the connecting rod storage has a central hollow cylindrical shape, and the plurality of seating recesses are equidistantly formed to be spaced apart from each other in the circumferential direction of the connecting rod storage.

The connecting rod supply may include: a supply-rotary rod provided inside the connecting rod storage to rotate with an external power source to detach the connecting rod seated in the seating recess and supply the same to the mounting recess of the mounting frame; and a rod-rotary unit connected to the supply-rotary rod to rotate the supply-rotary rod while moving up and down the supply-rotary rod in the connecting rod storage.

The supply-rotary rod may be circumferentially provided with a plurality of seating protrusions for seating the connecting rod in the seating recess, and when the supply-rotary rod is moved up by the rod-rotary unit, the connecting rod may be seated in the seating recess, and when the supply-rotary rod is moved down, the connecting rod may be detached from the seating recess.

The image-capturing unit may include: an endoscope camera configured to move near the foreign substances through the mounting hole and capture an image thereof; a camera control part connected to the endoscope camera to control the operation of the endoscope camera; and a monitor part provided to allow a user to check the image captured by the endoscope camera.

According to another aspect of the present disclosure, there is provided a method of removing foreign substances around a heating tube in a steam generator using an apparatus for removing foreign substances from a steam generator, wherein the apparatus includes a universal machine unit, a connecting rod unit including a distal end connecting rod and a plurality of connecting rods, a connecting rod moving unit, an image-capturing unit, and a controller, the method including: a first connecting rod mounting step of inserting the distal end connecting rod, to which the universal machine unit is connected to one end of the distal end connecting rod, into a heating tube, and mounting the connecting rod on the connecting rod moving unit by operating the connecting rod supply unit using the controller; a first connecting rod supply step of supplying the connecting rod mounted on the connecting rod moving unit into the heating tube so as to be connected to the distal end connecting rod by operating the connecting rod moving unit using the controller; a second connecting rod mounting step of mounting the connecting rod on the connecting rod moving unit by operating the connecting rod supply unit using the controller; a second connecting rod supply step of supplying the connecting rod mounted on the connecting rod moving unit into the heating tube so as to be connected to the connecting rod supplied into the heating tube by operating the connecting rod moving unit using the controller; a universal machine unit moving step of supplying a plurality of connecting rods into the heating tube to move the universal machine unit to a point where the foreign substances are located by sequentially performing the first connecting rod mounting step, the first connecting rod supply step, the second connecting rod mounting step, and the second connecting rod supply step; an image-capturing unit moving step of moving the image-capturing unit to the point where the foreign substances are located through the heating tube; and a foreign substance removal step of removing the foreign substances using the universal machine unit while checking the image-capturing unit.

According to the apparatus and method of removing foreign substances from a steam generator, the heating tubes can be prevented from being damaged by removing bulky foreign substances such as bolts or the like located on the upper portion of the bundle of heating tubes in the steam generator, which cannot be otherwise removed by conventional methods, thereby preventing quality-related issues that can affect the steam generator and the heating tubes during operation.

DETAILED DESCRIPTION OF THE INVENTION

Hereinafter, example embodiments of the present disclosure will be described in detail with reference to the accompanying drawings. Terms or words used in the description and the claims of the present disclosure should not be interpreted as being limited merely to common and dictionary meanings, but should be interpreted as meanings and concepts conforming to the technical spirit of the present disclosure based on the principle that an inventor may properly define the concept of the terms at his/her own discretion in order to describe the invention in the best manner possible.

Referring to FIGS. 4 to 11, an apparatus 100 for removing foreign substances from a steam generator according to an embodiment of the present disclosure is provided. The apparatus 100 is configured to remove foreign substances from around a heating tube 12 of a steam generator 10, and includes a universal machine unit 1100, a connecting rod unit 1200, a connecting rod moving unit 1300, a connecting rod supply unit 1400, an image-capturing unit 1500, and a controller 1600.

Figure 6:
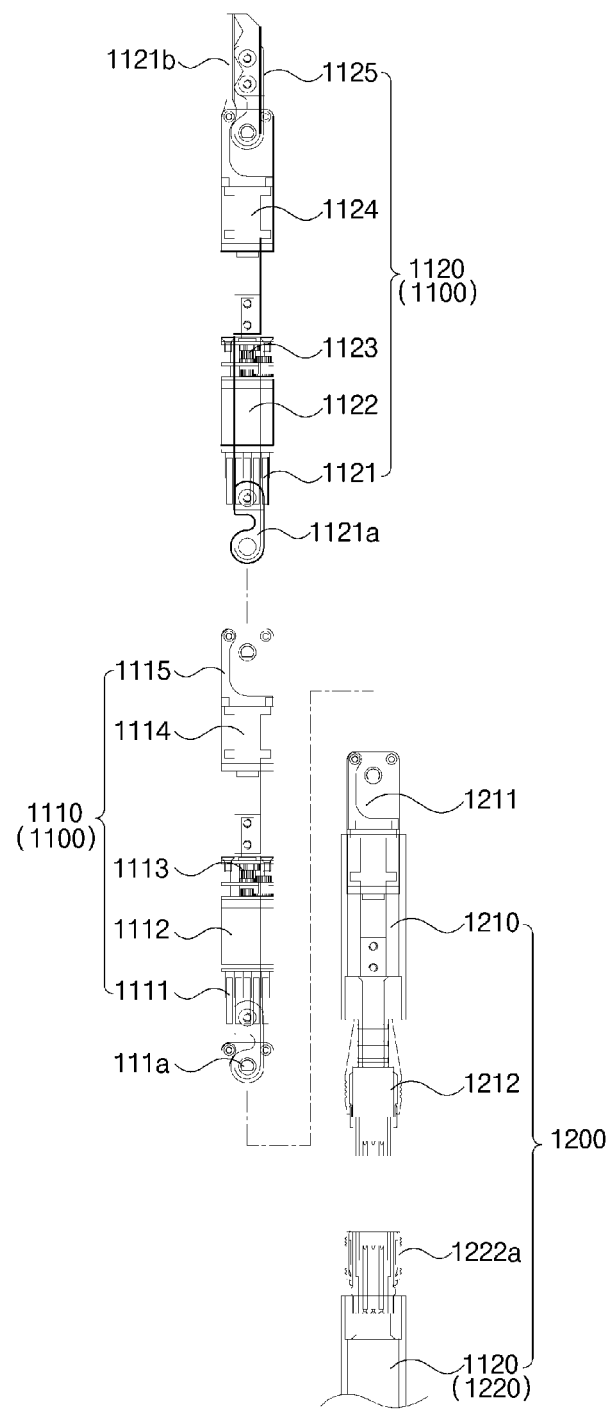
FIG. 6 is a view illustrating a state in which a universal machine unit and a connecting rod unit for holding foreign substances in the steam generator to remove the foreign substances are coupled.
Figure 7:
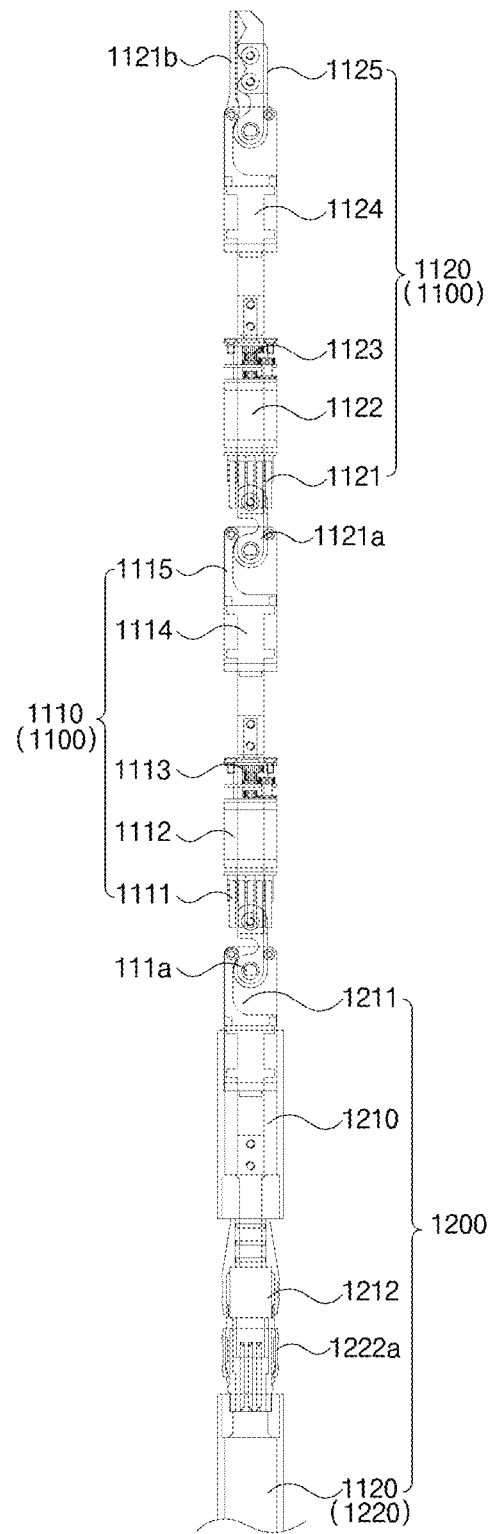
FIG. 7 is a view illustrating a state in which the universal machine unit illustrated in FIG. 6 is coupled to the connecting rod unit.
Figure 11:
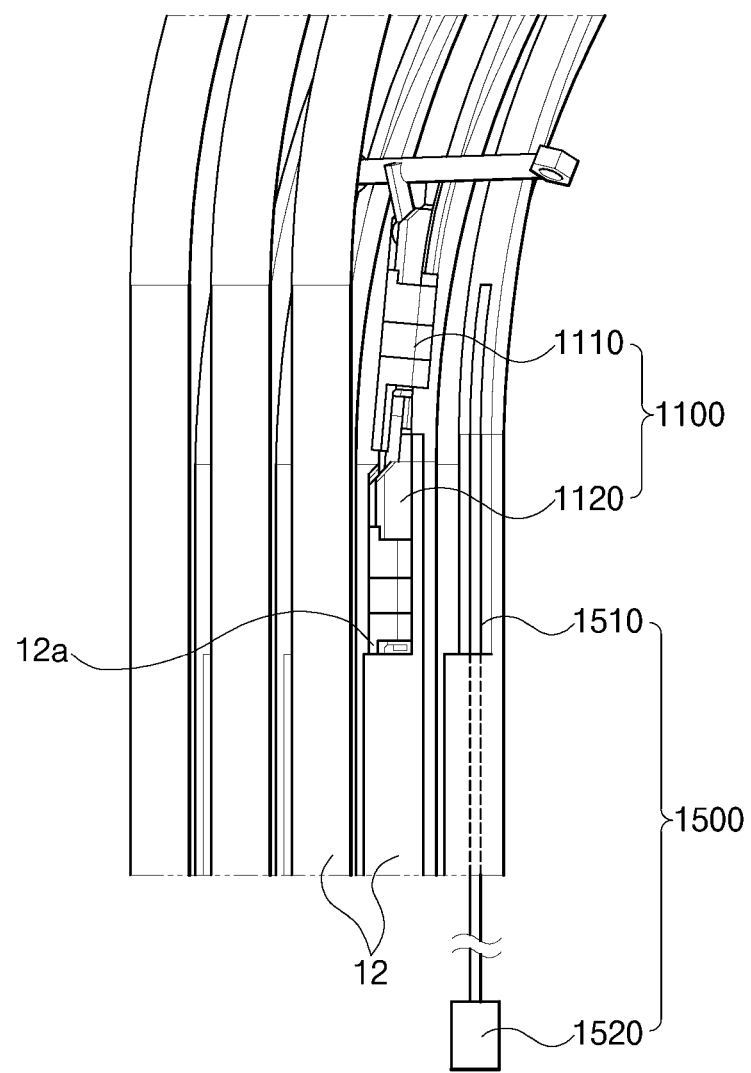
FIG. 11 is a view illustrating a state in which the universal machine unit holds and removes foreign substances using an imaging means moved to the outside of the heating tubes.

Referring to FIGS. 6, 7, and 11, the universal machine unit 1100 is configured to be inserted into the heating tube 12 and moved to the outside of the heating tube 12 through an opening 12a formed in the heating tube 12 to hold foreign substances located on top of a bundle of heating tubes 12. The universal machine unit 1100 is connected to one end of the connecting rod unit 1200 to be described later.

According to an embodiment, the universal machine unit 1100 may include a first universal machine 1110 and a second universal machine 1120. The first universal machine 1110 may be mounted on a distal end connecting rod 1210 positioned on the distal end of the connecting rod unit 1200 to be supplied into the heating tube 12. The second universal machine 1120 may be connected to the first universal machine 1110 so as to be moved to the outside of the heating tube 12 through the opening 12*a* of the heating tube 12 to hold foreign substances located on top of the bundle of heating tubes 12.

The first universal machine 1110 may include a first mounting body 1111, a first servomotor 1112, a first planetary gear reducer 1113, a first worm gear 1114, and a first rotation finger 1115. A mounting end 1111*a* may protrude from one end of the first mounting body 1111 so as to be mounted on the distal end connecting rod 1210 of the connecting rod unit 1200 to be described later. Since the mounting end 1111*a* is mounted on the distal end connecting rod 1210, one end of the first universal machine 1110 may be connected to the connecting rod unit 1200 to be described later.

The first mounting body 1111 may be provided with the first servomotor 1112, which is connected to the controller 1600 to be described later, and may be operated by the controller 1600 to rotate a rotating shaft (not shown) connected to the first servomotor 1112 in a forward or reverse direction.

The rotating shaft (not shown) connected to the first servomotor 1112 configured to be rotated by the controller 1600 may be connected to the first worm gear 1114 through the first planetary gear reducer 1113. The first planetary gear reducer 1113 may serve to transfer power transferred through the rotating shaft (not shown) to the first worm gear 1114 while decelerating the power.

The first planetary gear reducer 1113 may include a sun gear, a planetary gear, and an inner gear. The first planetary gear reducer 1113 may be a generally known planetary gear reducer, and thus a detailed description thereof will be omitted.

The first worm gear 1114 may be connected to the first rotation finger 1115, which is rotated up and down with respect to the first worm gear 1114 by the operation of the first worm gear 1114. The second universal machine 1120 may be connected to the first rotation finger 1115. As the first rotation finger 1115 rotates, the second universal machine 1120 connected to the first rotation finger 1115 may also rotate up and down.

The second universal machine 1120 may include a second mounting body 1121, a second servomotor 1122, a second planetary gear reducer 1123, a second worm gear 1124, and a second rotation finger 1125. A connecting end 1121*a* may be provided on one end of the second mounting body 1121 in a protruding manner. As the connecting end 1121*a* is connected to the first rotation finger 1115, the first universal machine 1110 and the second universal machine 1120 may be connected.

A holding end 1121*b* may be provided on the other end of the second mounting body 1121 so as to protrude outward. The second servomotor 1122 may be provided on the second mounting body 1121. The second servomotor 1122 may be connected to the controller 1600 to be described later, and operated by the controller 1600 to rotate a rotating shaft (not shown) connected to the second servomotor 1122 in a forward or reverse direction.

The rotating shaft (not shown) connected to the second servomotor 1122 configured to be rotated by the controller 1600 may be connected to the second worm gear 1124 through the second planetary gear reducer 1123. The second planetary gear reducer 1123 may serve to transfer power transferred through the rotating shaft (not shown) to the second worm gear 1124 while decelerating the power. The second worm gear 1124 may have the same configuration as the first worm gear 1114, and thus a detailed description thereof will be omitted.

The second worm gear 1124 may be connected to the second rotation finger 1125, and the second rotation finger 1125 may be rotated up and down with respect to the second worm gear 1124 by the operation of the second worm gear 1124. The second rotation finger 1125 may serve to hold foreign substances in association with the holding end 1121*b* protruding outward from the other end of the second mounting body 1121.

Figure 8:
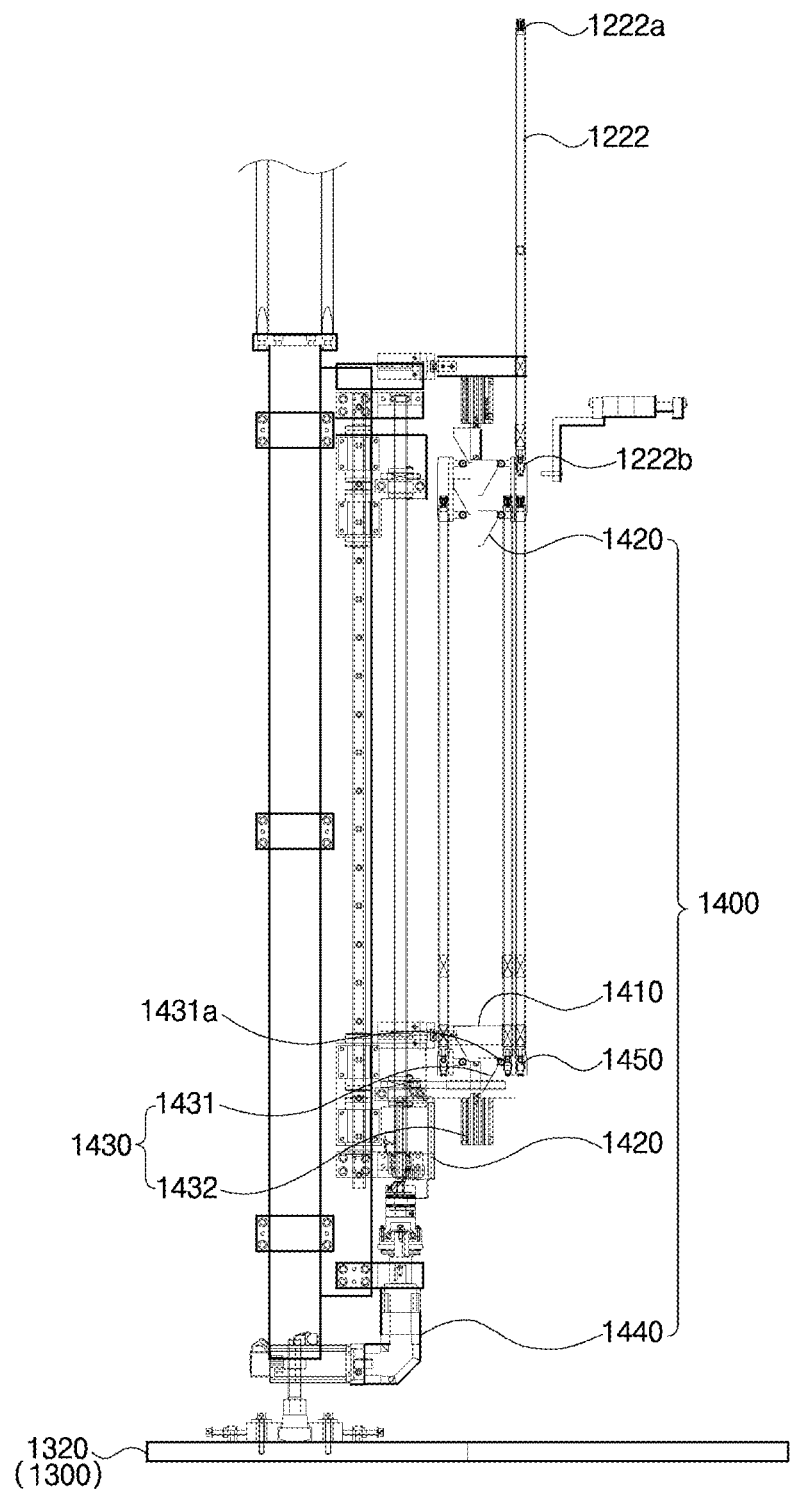
FIG. 8 is an enlarged view of a connecting rod supply unit illustrated in FIG. 4.

Referring to FIGS. 6 to 8, one end of the universal machine unit 1100, particularly, the first mounting body 1111 of the first universal machine 1110, may be connected to the connecting rod unit 1200. The connecting rod unit 1200 may be inserted into and moved along the heating tube 12 so as to move the universal machine unit 1100.

According to an embodiment, the connecting rod unit 1200 may include the distal end connecting rod 1210 and a connecting rod part 1220 to which a plurality of connecting rods 1222 are connected. The distal end connecting rod 1210 may be positioned at the distal end of the connecting rod unit 1200 so as to be connected to the universal machine unit 1100. The connecting rod part 1220 may be connected to the distal end connecting rod 1210. As the plurality of connecting rods 1222 may be connected to the distal end connecting rod 1210, the distal end connecting rod 1210 may be lengthened so as to move the universal machine unit 1100 inside the heating tube 12. The plurality of connecting rods 1222 may be connected in a series or in a sequence and the number of connecting rods to be connected in the series or in the sequence may be controlled by the controller 1600, thus making the total length of the connecting rod unit 1200 adjustable.

A connecting end 1211 may be provided on one end of the distal end connecting rod 1210 in a protruding manner so as to be connected to the mounting end 1111*a* protruding from the first mounting body 1111 of the first universal machine 1110. As the connecting end 1211 is connected to the mounting end 1111*a*, the distal end connecting rod 1210 and the first universal machine 1110 may be connected so that the connecting rod unit 1200 and the universal machine unit 1100 may be connected.

A distal end connecting rod's connector end recess 1212 may be provided on the other end of the distal end connecting rod 1210 in a protruding manner. As a connector end protrusion 1222*a* provided on the connecting rods 1222 of the connecting rod part 1220 is connected to the distal end connecting rod's connector end recess 1212, the distal end connecting rod 1210 and the connecting rod part 1220 are connected.

Preferably, the connector end protrusion 1222*a* available to be connected to the distal end connecting rod's connector end recess 1212 may be provided in a protruding manner on one end of each of the plurality of connecting rods 1222 of the connecting rod part 1220. In addition, a connector end recess 1222*b* may be provided on the other end of the connecting rods 1222 in a protruding manner. The connector end recess 1222*b* may in a same shape with the distal end connecting rod's connector end recess 1212. The connector end protrusion 1222*a* provided on one end of another connecting rod 1222 may be connected to the connector end recess 1222b of the another connecting rod 1222. As the plurality of connecting rods 1222 are connected or disconnected by the connector end protrusion 1222a and the connector end recess 1222b, the length of the connecting rod part 1220 may be increased or reduced.

Figure 9:
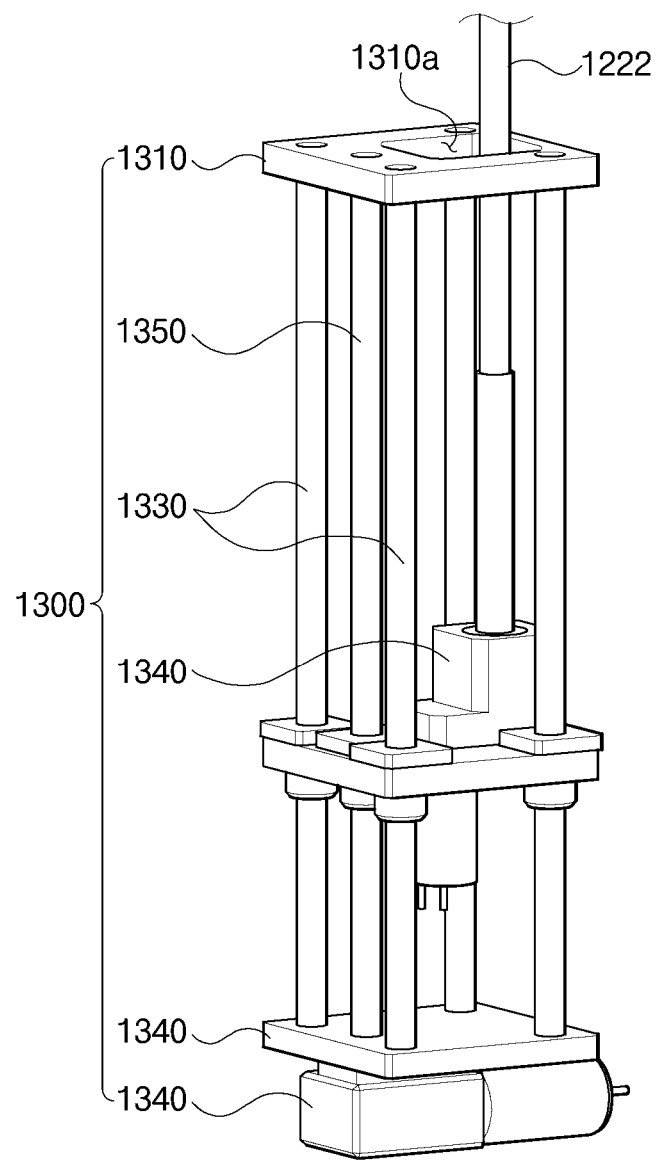
FIG. 9 is an enlarged view of a connecting rod moving unit illustrated in FIG. 4.
Figure 10:
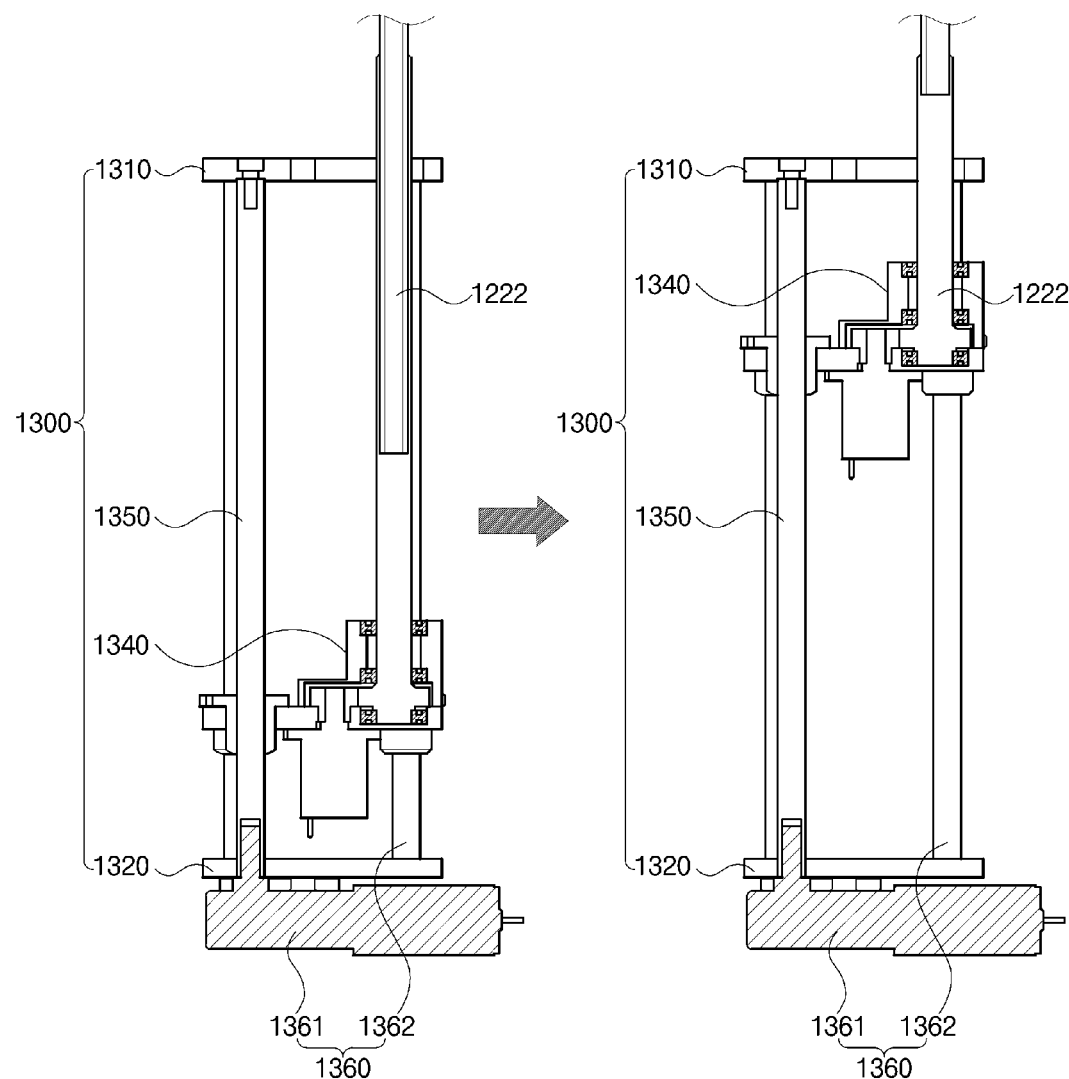
FIG. 10 is a view illustrating a state in which the connecting rod moving unit in FIG. 9 lifts and lowers a connecting rod.

Referring to FIGS. 8 to 10, as the connecting rod unit 1200 is supplied into the heating tube 12 from the outside the heating tube 12 by the connecting rod moving unit 1300. According to an embodiment, the length of the connecting rod unit 1200 may be increased and one end of the connecting rod unit 1200 may be moved inside the heating tube 12, thereby moving the universal machine unit 1100 connected to one end of the connecting rod unit 1200.

According to an embodiment, the connecting rod moving unit 1300 may be positioned outside the heating tube 12, and may include a first support frame 1310, a second support frame 1320, a plurality of connecting frames 1330, a vertical lifting body 1340, a guide rod 1350, and a vertical lifting body moving part 1360.

The first support frame 1310 may be mounted on a tube sheet 10a of the steam generator 10, and provided with a through-hole through which the connecting rod unit 1200 passes. Preferably, the first support frame 1310 may be mounted on the tube sheet 10a using a mounting unit (not shown).

The second support frame 1320 may be spaced apart from the first support frame 1310. The first support frame 1310 and the second support frame 1320 spaced apart from each other may be connected by the plurality of connecting frames 1330. Particularly, both ends of each of the plurality of connecting frames 1330 may be mounted on the support frame 1310 and the second support frame 1320 by a mounting unit (not shown).

The vertical lifting body 1340 may be provided between the first support frame 1310 and the second support frame 1320. The vertical lifting body 1340 may be provided with a fastening member (not shown) for fastening the connecting rods 1222 supplied from the connecting rod supply unit 1400 to be described later. The vertical lifting body 1340 may supply the connecting rods 1222 into the heating tube 12 while moving up and down between the first support frame 1310 and the second support frame 1320.

The guide rod 1350 may be provided between the first support frame 1310 and the second support frame 1320. The vertical lifting body 1340 may be connected to the guide rod 1350. The guide rod 1350 serves to guide up-down movement of the vertical lifting body 1340.

The vertical lifting body moving part 1360 may be mounted on the second support frame 1320. The vertical lifting body moving part 1360 may be positioned vertically downside of the second support frame 1320. The vertical lifting body moving part 1360 may be connected to the vertical lifting body 1340 to vertically move the vertical lifting body 1340 on the guide rod 1350. The vertical lifting body moving part 1360 may include a hydraulic rod 1361 and a hydraulic motor 1362.

Particularly, the second support frame 1320, on which the vertical lifting body moving part 1360 is mounted, may be provided with a through-hole (not shown) through which the vertical lifting body moving part 1360 passes. One end of the hydraulic rod 1361 may be connected to the vertical lifting body 1340 to vertically move the vertical lifting body 1340 during sliding movement. The other end of the hydraulic rod 1361 may be connected to the hydraulic motor 1362. The hydraulic motor 1362 may serve to provide power to vertically move the hydraulic rod 1361. The components of the vertical lifting body moving part 1360 are not limited to the hydraulic rod 1361 and the hydraulic motor 1362. Other means for performing the same function to vertically move the vertical lifting body 1340 may be used.

Figure 1:
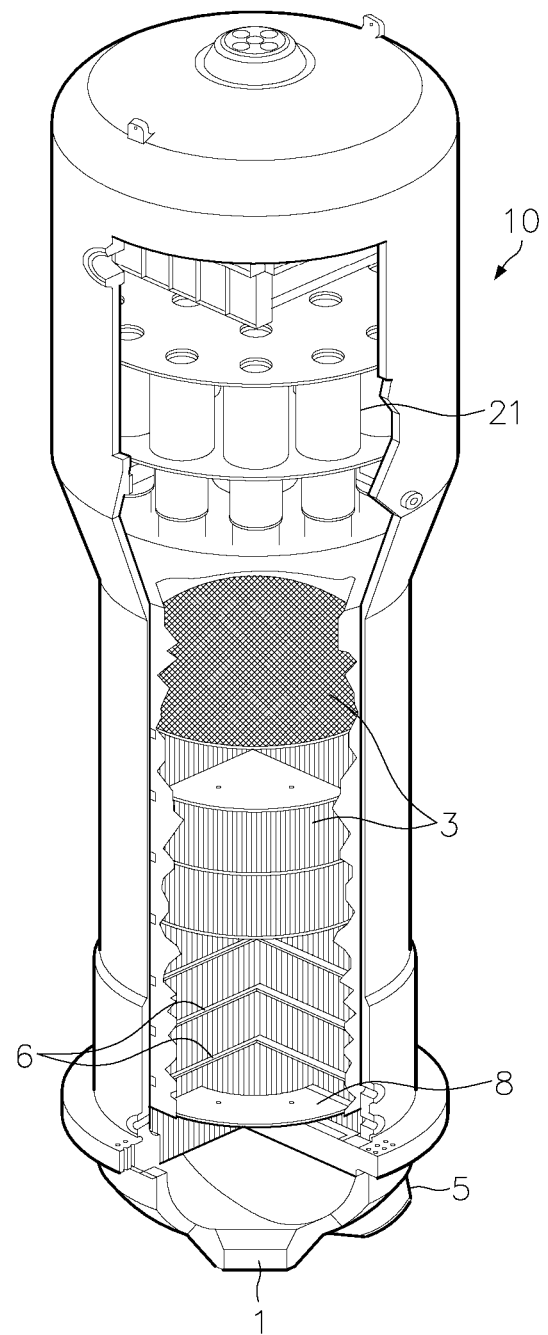
FIG. 1 is a cross-sectional view illustrating a steam generator.
Figure 2:
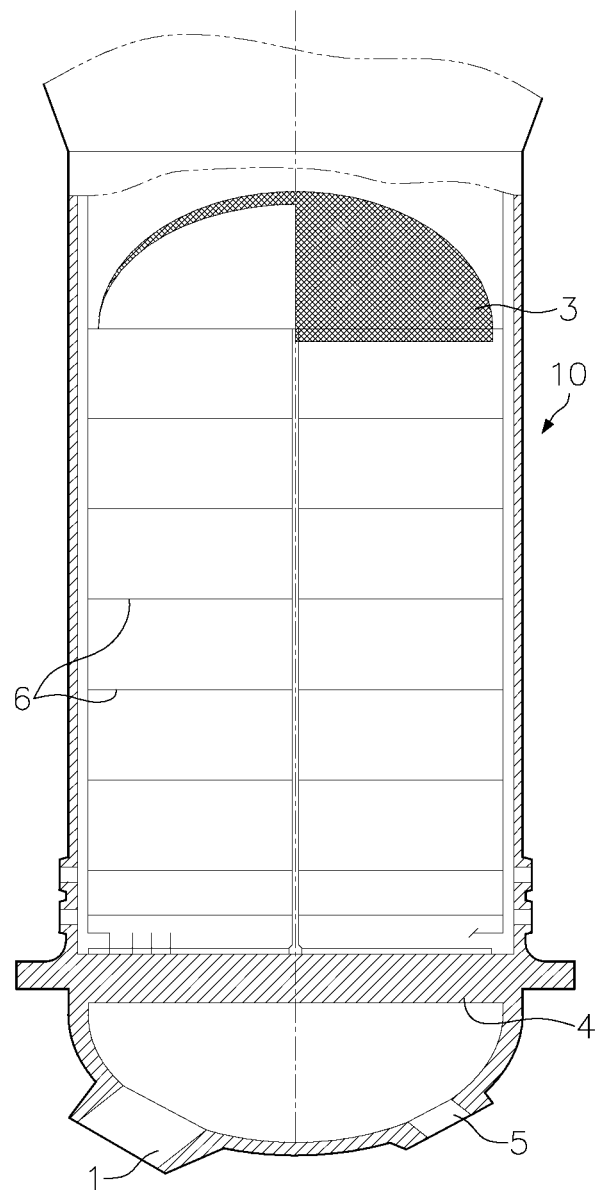
FIG. 2 is a front view illustrating the steam generator in FIG. 1.
Figure 3:
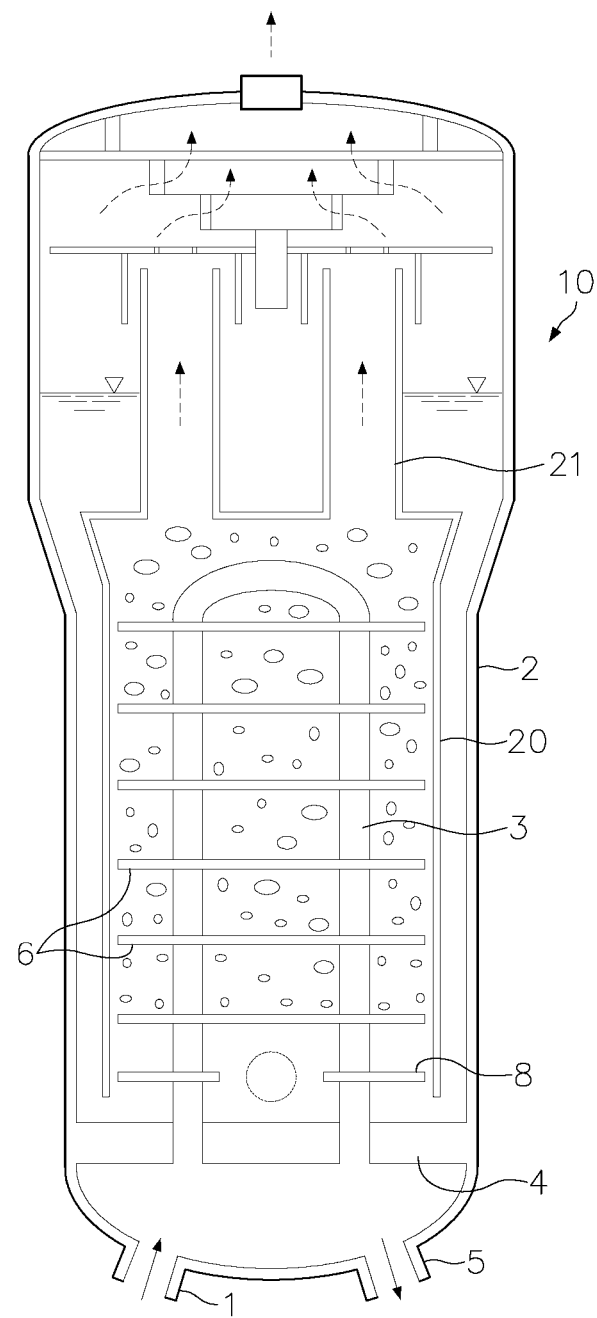
FIG. 3 is a cross-sectional view schematically illustrating an operational principle of the steam generator.
Figure 4:
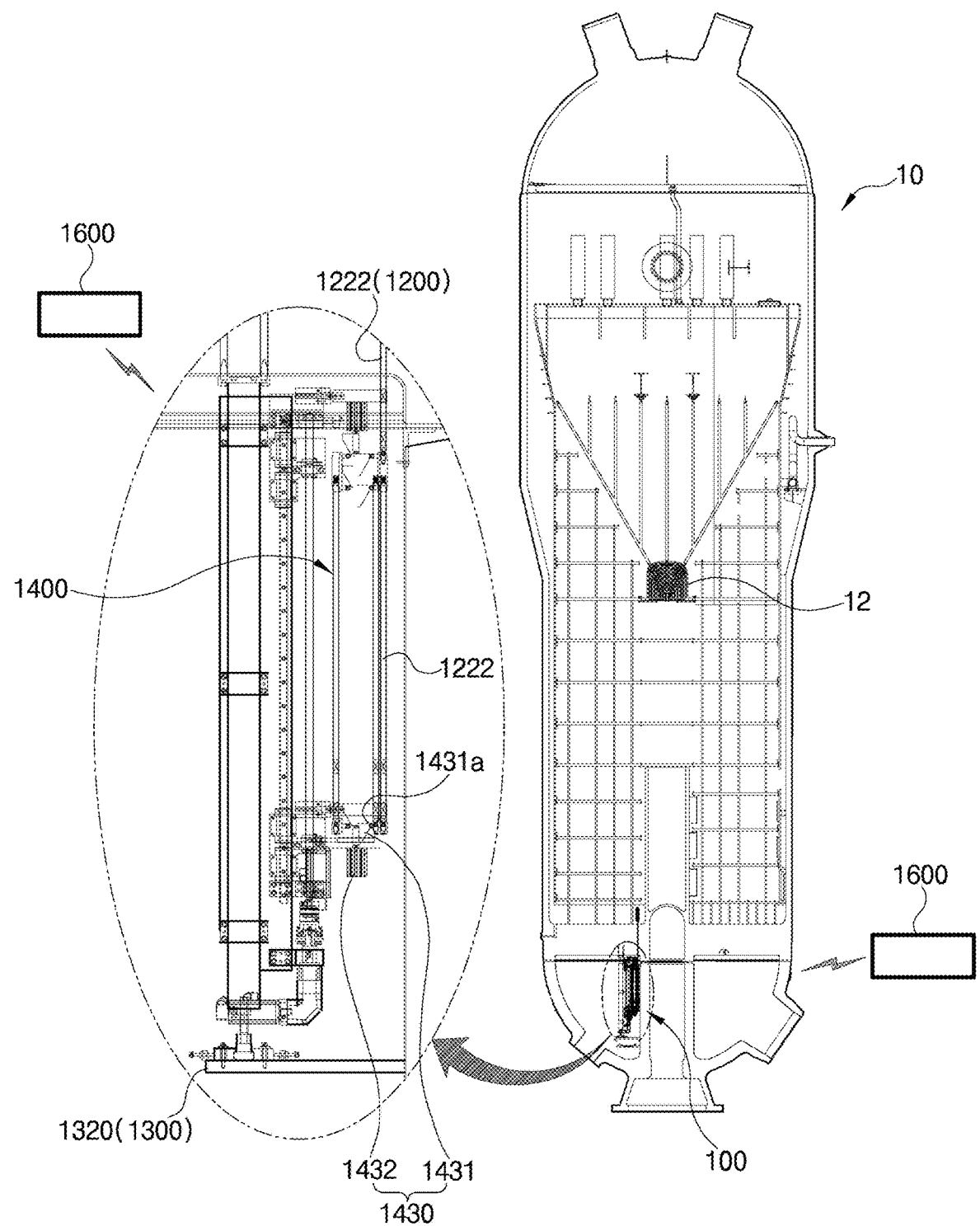
FIG. 4 is a front view schematically illustrating a state in which a foreign substance removing apparatus according to an embodiment of the present disclosure is installed in the steam generator, along with an enlarged view of the foreign substance removing apparatus.
Figure 5:
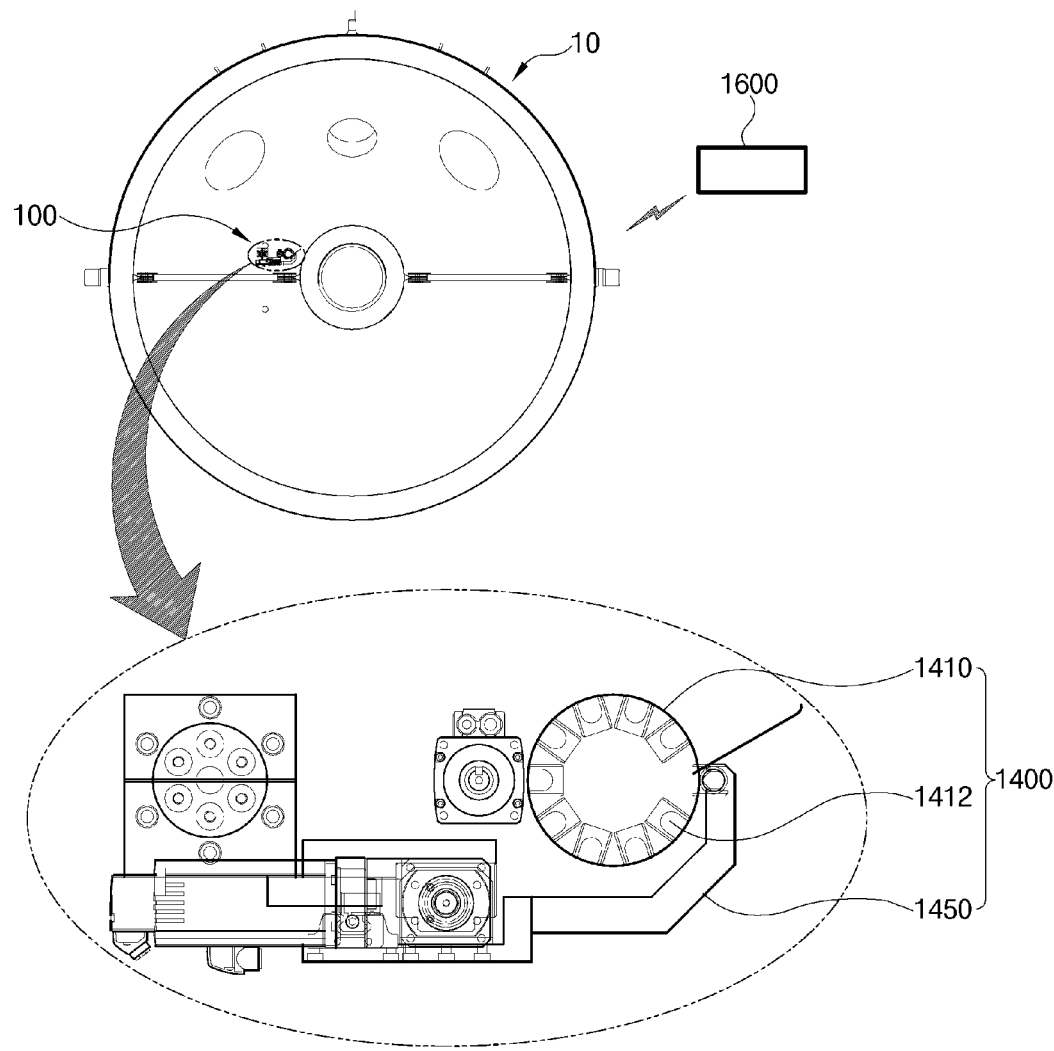
FIG. 5 is a plan view schematically illustrating a state in which the foreign substance removing apparatus is installed in the steam generator, along with an enlarged view of the foreign substance removing apparatus.

Referring to FIGS. 4, 5, and 8, according to an embodiment, the connecting rod supply unit 1400 may be provided adjacent to the connecting rod moving unit 1300. The connecting rod supply unit 1400 may serve to sequentially supply the plurality of connecting rods 1222 to the connecting rod moving unit 1300. The connecting rod supply unit 1400 may include a connecting rod storage 1410, a storage-rotary motor 1420, a connecting rod supply 1430, and a supply-rotary motor 1440. The connecting rod supply unit 1400 may further include a mounting frame 1450.

The connecting rod storage 1410 may be rotatably provided adjacent to the connecting rod moving unit 1300. The connecting rod storage 1410 may have a central hollow cylindrical portion. The connecting rod storage 1410 may be provided with a plurality of seating recesses 1412 in which the plurality of connecting rods 1222 are stored. The plurality of seating recesses 1412 may be equidistantly spaced apart from each other in a circumferential direction of the connecting rod storage 1410. The connecting rod storage 1410 may be connected to the storage-rotary motor 1420 to rotate about the central portion of the connecting rod storage 1410. The storage-rotary motor 1420 may serve to provide power to rotate the connecting rod storage 1410.

The connecting rod supply 1430 may be provided inside the connecting rod storage 1410. The connecting rod supply 1430 may serve to move the connecting rods 1222 seated in the plurality of seating recesses 1412 to a connecting rod insertion point (not shown) of the connecting rod moving unit 1300 while rotating inside the connecting rod storage 1410. The connecting rod supply 1430 rotated by the supply-rotary motor 1440 may include a supply-rotary rod 1431 and a rod-rotary unit 1432.

The connecting rod supply 1430 may be connected to the supply-rotary motor 1440. The supply-rotary motor 1440 may serve to provide power to rotate the connecting rod supply 1430 in the circumferential direction of the connecting rod supply 1430.

The mounting frame 1450 may be provided to be spaced apart from the connecting rod storage 1410. The mounting frame 1450 may be connected to the connecting rod moving unit 1300. Particularly, the mounting frame 1450 may be provided with a mounting recess 1452 in which the connecting rods 1222 to be moved in the connecting rod storage 1410 is mounted on the connecting rod insertion point (not shown).

The supply-rotary rod 1431 may be provided inside the connecting rod storage 1410 so as to be rotated by an external power source to seat the connecting rods 1222 in the seating recesses 1412 or detach the connecting rods 1222 seated in the seating recesses 1412 and supply the connecting rods to the mounting recess 1452 of the mounting frame 1450. The supply-rotary rod 1431 may be provided with a plurality of seating protrusions 1431a.

The rod-rotary unit 1432 may be connected to the supply-rotary rod 1431 to rotate the supply-rotary rod 1431 while vertically moving the same in the connecting rod storage 1410. When the supply-rotary rod 1431 moves upward in the connecting rod storage 1410 by the rod-rotary unit 1432, the connecting rods 1222 may be seated in the seating recesses 1412, and when the supply-rotary rod 1431 moves downward in the connecting rod storage 1410 by the rod-rotary unit 1432, the connecting rods 1222 may be detached from the seating recesses 1412 and supplied to the mounting recess 1452 of the mounting frame 1450.

The plurality of seating protrusions 1431a may serve to prevent the connecting rods 1222 seated in the plurality of seating recesses 1412 of the connecting rod storage 1410 from being detached from the seating recesses 1412. Mounting protrusions 1431b may serve to detach the connecting rods 1222, seated in the seating recesses 1412, from the seating recesses 1412. The connecting rods 1222 detached from the seating recesses 1412 may be supplied to the mounting recess 1452 of the mounting frame 1450. Particularly, the mounting protrusions 1431b are positioned below the plurality of seating protrusions 1431a formed on the circumferential surface of the supply-rotary rod 1431.

Referring to FIG. 11, according to an embodiment, the image-capturing unit 1500 may move to a position where foreign substances are positioned through the heating tube 12. The image-capturing unit 1500 may move inside the heating tube 12 and then exits the heating tube 12 to a position through the opening 12a of the heating tube 12. At that position, the image-capturing unit 1500 may serve to capture an image of the foreign substances and transmits the captured image so that an operator may determine the position of the foreign substances and the approach of the universal machine unit 1100 to the foreign substances.

The image-capturing unit 1500 may include an endoscope camera 1510, a camera control part 1520, and a monitor part (not shown). The endoscope camera 1510 may be inserted into and moves inside the heating tube 12. The camera control part 1520, which is held by a user to operate the endoscope camera 1510, may be connected to the other end of the endoscope camera 1510. Since the endoscope camera 1510 moves inside the heating tube 12 to a position where foreign substances are present through the opening 12a of the heating tube 12, the endoscope camera 1510 may smoothly move without disturbance by the bundle of heating tubes 12.

The image captured by the endoscope camera 1510 may be transmitted to the monitor part (not shown). Then, the user may hold the foreign substances positioned on top of the bundle of heating tube and then remove the same using the universal machine unit 1100 while watching the monitor part (not shown). The endoscope camera 1510 and a method of operating the endoscope camera 1510 are well-known in the art, so a detailed description thereof will be omitted.

Referring to FIGS. 4 and 5, according to an embodiment, the universal machine unit 1100, the connecting rod moving unit 1300, and the connecting rod supply unit 1400 may be connected to the controller 1600. The controller 1600 may serve to control the operation of the universal machine unit 1100, the connecting rod moving unit 1300, and the connecting rod supply unit 1400. The operation of the controller 1600 may be preferably controlled by a user.

The image-capturing unit 1500 and the universal machine unit 1100 may smoothly move to the foreign substances positioned on top of the bundle of heating tubes 12 through the opening 12a of the heating tube 12 without disturbance by the bundle of heating tubes 12. Thus, the bulky foreign substances, such as bolts or the like, located on top of the bundle of heating tubes 12 may be held and retrieved using the universal machine unit 1100 that is easy to operate, thereby preventing the heating tubes 12 from being damaged.

Referring to FIGS. 4 to 12, according to an embodiment of the present disclosure, there is provided a method of removing foreign substances, such as bolts or the like, located on top of a bundle of heating tubes in a steam generator using the foreign substance removing apparatus 100 according to the embodiment of the present disclosure.

The apparatus 100 includes a universal machine unit 1100, a connecting rod unit 1200, a connecting rod moving unit 1300, a connecting rod supply unit 1400, an image-capturing unit 1500, and a controller 1600. The method includes a first connecting rod mounting step S10, a first connecting rod supply step S20, a second connecting rod mounting step S30, a second connecting rod supply step S40, a universal machine unit moving step S50, an image-capturing unit moving step S60, and a foreign substance removal step S70.

Figure 12:
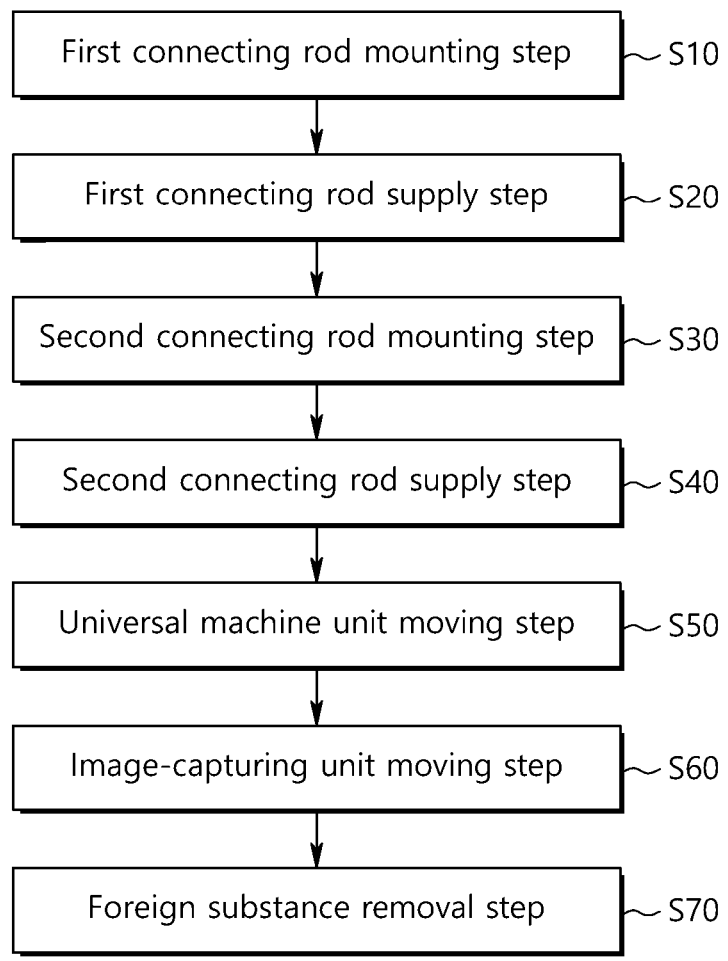
FIG. 12 is a flowchart illustrating a procedure of removing foreign substances from a steam generator using the foreign substance removing apparatus according to an embodiment of the present disclosure.

Referring to FIGS. 8, 10 and 12, according to an embodiment, in the first connecting rod mounting step S10, after the end connecting rod 1210 of the connecting rod unit 1200, to which the universal machine unit 1100 is connected at one end, may be inserted into the heating tube 12, the plurality of connecting rods 1222 constituting the connecting rod part 1220 of the connecting rod unit 1200 may be mounted on the connecting rod moving unit 1300 by the connecting rod supply unit 1400 operated by the controller 1600. One of the plurality of connecting rods 1222 seated in the connecting rod storage 1410 of the connecting rod supply unit 1400 may be mounted on the lifting body 1340 of the connecting rod moving unit 1300 by operating the connecting rod supply unit 1400 using the controller 1600.

After the first connecting rod mounting step S10, the first connecting rod supply step S20 may be performed such that the connecting rod 1222 mounted on the lifting body 1340 of the connecting rod moving unit 1300 is supplied into the heating tube so as to be connected to the distal end connecting rod 1210 inserted into the heating tube 12 by the connecting rod moving unit 1300 operated by the controller 1600. The lifting body 1340, on which the connecting rod 1222 is mounted, may be moved up by the lifting body moving part 1360 so that the connecting rod 1222 is moved into the heating tube 12 and connected to the distal end connecting rod 1210 to allow the universal machine unit 1100 connected to the distal end connecting rod 1210 to be moved inside the heating tube 12.

After the first connecting rod supply step S20, the second connecting rod mounting step S30 may be performed. It is preferred that before the second connecting rod mounting step S30, the lifting body moving the connecting rod 12 may return to its original state in the first connecting rod supply step S20.

The second connecting rod mounting step S30 may be a step of mounting the connecting rods 1222 on the connecting rod moving unit 1300 by operating the connecting rod supply unit 1400 using the controller 1600. Another connecting rod 1222 seated in the connecting rod storage 1410 of the connecting rod supply unit 1400 may be mounted on the vertical lifting body 1340 of the connecting rod moving unit 1300 by operating the connecting rod supply unit 1400 using the controller 1600.

After the second connecting rod mounting step S30, the second connecting rod supply step S40 may be performed. The second connecting rod supply step S40 is a step of inputting another connecting rod 1222 mounted on the vertical lifting body 1340 of the connecting rod moving unit 1300 into heating tube 12 by operating the connecting rod moving unit 1300 using controller 1600, so that the other connecting rod 1222 may be connected to the connecting rod 1222 connected to the distal end connecting rod 1210 on which the universal machine unit 1100 is mounted.

As the vertical lifting body moving part 1360 vertically lifts the vertical lifting body 1340 on which the connecting rods 1222 are mounted, the other connecting rod 1222 may be moved into the heating tube 12 and connected to the connecting rod 1222 connected to the distal end connecting rod 1210, thereby increasing the length of the connecting rod unit 1200 connected to the universal machine unit 1100.

After the second connecting rod supply step S40, the universal machine unit moving step S50 may be performed. The universal machine unit moving step S50 is a step of supplying the plurality of connecting rods 1222 into the heating tube 12 by sequentially repeating the first connecting rod mounting step S10, the first connecting rod supply step S20, the second connecting rod mounting step S30, and the second connecting rod supply step S40, thereby moving the universal machine unit 1100 to a point at which foreign substances are located through the heating tube 12.

Referring to FIGS. 6 and 7, according to an embodiment, the plurality of connecting rods 1222 may be sequentially supplied into the heating tube 12 and connected to each other, thereby increasing the length of the connecting rod unit 1200. The universal machine unit 1100 mounted on the connecting rod unit 1200 may be moved inside the heating tube 12 by the increased length and moved to the point at which foreign substrates are located through the opening 12a of the heating tube 12.

Since detailed descriptions of the connecting rod supply unit 1400 supplying the connecting rods 1222 and the connecting rod moving unit 1300 moving the connecting rods 1222 into the heating tube 12 have been provided in the description of the apparatus 100 for removing foreign substances from a steam generator according to an embodiment of the present disclosure, repetitive descriptions thereof will be omitted.

Referring to FIG. 12, after the universal machine unit moving step S50, the image-capturing unit moving step S60 is performed. The image-capturing unit moving step S60 is a step of moving the image-capturing unit 1500 through a heating tube 12 adjacent to the heating tube 12 through which the universal machine unit 1100 is moving.

Referring to FIG. 11, the image-capturing unit 1500 may include the endoscope camera 1510, the camera control part 1520, and the monitor part (not shown). The image-capturing unit 1500 may be moved through the heating tube 12 adjacent to the heating tube 12 through which the universal machine unit 1100 is moved. In this manner, the image-capturing unit 1500 may serve to determine the position of foreign substances, capture images of the universal machine unit 1100, and transmit the captured images, thereby allowing the user to recognize the universal machine unit 1100 approaching foreign substances to hold and remove foreign substances.

Referring to FIGS. 6 and 12, after the image-capturing unit moving step S60, the foreign substance removal step S70 is performed. The foreign substance removal step S70 is a step of removing foreign substances using the universal machine unit 1100 while recognizing the image-capturing unit 1500.

In the foreign substance removal step S70, the universal machine unit 1100, which holds and removes foreign substances, may include the first universal machine 1110 and the second universal machine 1120. Since a detailed description of the universal machine unit 1100 has been provided in the description of the apparatus 100 for removing foreign substances from a steam generator according to an embodiment of the present disclosure, a repetitive description thereof will be omitted.

It is preferable to perform a removing apparatus recovery step (not shown) of recovering the connecting rod unit 1200 and the universal machine unit 1100 after performing the foreign substance removal step S70.

According to the apparatus and method of removing foreign substances from a steam generator, the heating tubes 12 can be protected from being damaged by removing bulky foreign substances such as bolts or the like located on the upper portion of the bundle of heating tubes 12 in the steam generator 10, which cannot be otherwise removed by conventional methods. Thereby, the present disclosure prevents quality-related issues that can affect the steam generator 10 and the heating tubes 12 during operation.

Although the present disclosure has been described with reference to the embodiments illustrated in the drawings, the described embodiments are merely illustrative, so those skilled in the art will understand that various modifications and equivalents thereof can be made therefrom. Therefore, the true technical scope of the present disclosure should be determined by the technical spirit of the appended claims.

The invention claimed is:

1. An apparatus for removing foreign substances around a heating tube of a steam generator, the apparatus comprising:
    a universal machine unit configured to be inserted into, moved along, and discharged out of the heating tube through an opening formed in the heating tube to hold the foreign substances;
    a connecting rod unit including a distal end connecting rod to which the universal machine unit is connected at one end of the distal end connecting rod and which is inserted into and moved along the heating tube to move the universal machine unit, and a connecting rod part to which a plurality of connecting rods are connected and which is connected to the distal end connecting rod;
    a connecting rod moving unit configured to supply the connecting rod unit from the outside to the inside of the heating tube to move the connecting rod unit;
    a connecting rod supply unit provided adjacent to the connecting rod moving unit to sequentially supply the plurality of connecting rods to the connecting rod moving unit;
    an image-capturing unit configured to be moved to a point where the foreign substances are located through the heating tube to capture an image of the foreign substances to allow a user to check the position of the foreign substances and the approach of the universal machine unit to the foreign substances; and
    a controller connected to the universal machine unit, the connecting rod moving unit, and the connecting rod supply unit to control operations of the universal machine unit, the connecting rod moving unit, and the connecting rod supply unit.

2. The apparatus according to claim 1, wherein the universal machine unit comprises:
    a first universal machine mounted on the distal end connecting rod positioned at a distal end of the connecting rod unit supplied into the heating tube; and
    a second universal machine connected to the first universal machine and configured to be moved out of the heating tube through the opening formed in the heating tube to hold the foreign substances around the heating pipe.

3. The apparatus according to claim 2, wherein the first universal machine comprises:
    a first mounting body having, at one end thereof, a mounting end mounted on the distal end connecting rod to protrude therefrom;
    a first servomotor provided in the first mounting body and connected to the controller;

a first planetary gear reducer connected to the first servomotor via a rotating shaft;
a first worm gear connected to the first planetary gear reducer; and
a first rotating finger connected to the first worm gear to rotate up and down by the operation of the first worm gear, and connected to the second universal machine,
wherein both ends of the distal end connecting rod are respectively provided with a connecting end, to which the mounting end is connected, and a connector end recess, in a protruding manner,
a connector end protrusion is connected to the connector end recess, the connector end protrusion protruding from one end of the connecting rod to which the end connecting rod is connected, and a connector end recess, to which the connector end protrusion is connected, is provided to protrude from the other end of the connecting rod.

4. The apparatus according to claim 3, wherein the second universal machine comprises:
a second mounting body having a connecting end protruding outward from one end of the second mounting body to be connected to the first rotating finger, and a holding end protruding outward from the other end;
a second servomotor provided on one end side of the second mounting body and connected to the controller;
a second planetary gear reducer connected to the second servomotor via a rotating shaft;
a second worm gear connected to the second planetary gear reducer; and
a second rotating finger connected to the second worm gear to rotate up and down by the operation of the second worm gear, and operated in association with the holding end to hold the foreign substances.

5. The apparatus according to claim 1, wherein the connecting rod moving unit comprises:
a first support frame mounted on a tube sheet of the steam generator and having a through-hole through which the connecting rod passes;
a second support frame provided to be spaced apart from the first support frame;
a plurality of connecting frames connecting the first support frame and the second support frame;
a vertical lifting body provided to be moved up and down between the first support frame and the second support frame and having a fastening member to fasten the connecting rod supplied from the connecting rod supply unit;
a guide rod provided between the first support frame and the second support frame to be connected to the lifting body to guide the movement of the lifting body; and
a lifting body moving part mounted on the second support frame to be connected to the lifting body to move up and down the lifting body from the guide rod.

6. The apparatus according to claim 5, wherein the second support frame is provided with a through-hole through which the lifting body moving part passes, the lifting body moving part comprising:
a hydraulic rod connected to the lifting body to move up and down the lifting body during sliding movement thereof; and
a hydraulic motor connected to an end of the hydraulic rod to provide power to move the hydraulic rod.

7. The apparatus according to claim 1, wherein the connecting rod supply unit comprises:
a connecting rod storage rotatably provided in the connecting rod moving unit to store a plurality of connecting rods, and having a plurality of seating recesses spaced apart from each other such that the stored connecting rods are seated therein;
a storage-rotary motor connected to the connecting rod storage to provide power to rotate the connecting rod storage in a circumferential direction;
a connecting rod supply provided inside the connecting rod storage to rotate and move the connecting rod seated in the plurality of seating recesses to a connecting rod insertion point of the connecting rod moving unit;
a supply-rotary motor connected to the connecting rod supply to rotate the connecting rod supply in the circumferential direction of the connecting rod storage; and
a mounting frame provided to be spaced apart from the connecting rod storage and connected to the connecting rod moving unit and having a mounting recess provided to mount the connecting rod moved in the connecting rod storage on the connecting rod insertion point,
wherein the connecting rod storage has a central hollow cylindrical shape, and the plurality of seating recesses are equidistantly formed to be spaced apart from each other in the circumferential direction of the connecting rod storage.

8. The apparatus according to claim 7, wherein the connecting rod supply comprises:
a supply-rotary rod provided inside the connecting rod storage to rotate with an external power source to detach the connecting rod seated in the seating recess and supply the same to the mounting recess of the mounting frame; and
a rod-rotary unit connected to the supply-rotary rod to rotate the supply-rotary rod while moving up and down the supply-rotary rod in the connecting rod storage.

9. The apparatus according to claim 8, wherein the supply-rotary rod is circumferentially provided with a plurality of seating protrusions for seating the connecting rod in the seating recess, and
when the supply-rotary rod is moved up by the rod-rotary unit, the connecting rod is seated in the seating recess, and when the supply-rotary rod is moved down, the connecting rod is detached from the seating recess.

10. The apparatus according to claim 1, wherein the image-capturing unit comprises:
an endoscope camera configured to move near the foreign substances through the mounting hole and capture an image thereof;
a camera control part connected to the endoscope camera to control the operation of the endoscope camera; and
a monitor part provided to allow a user to check the image captured by the endoscope camera.

11. A method of removing foreign substances around a heating tube in a steam generator using an apparatus for removing foreign substances from a steam generator, wherein the apparatus comprises a universal machine unit, a connecting rod unit including a distal end connecting rod and a plurality of connecting rods, a connecting rod moving unit, a connecting rod supply unit, an image-capturing unit, and a controller, the method comprising:
a first connecting rod mounting step of inserting the distal end connecting rod, to which the universal machine unit is connected to one end of the distal end connecting rod, into a heating tube, and mounting the connecting rod on the connecting rod moving unit by operating the connecting rod supply unit using the controller;

a first connecting rod supply step of supplying the connecting rod mounted on the connecting rod moving unit into the heating tube to be connected to the distal end connecting rod by operating the connecting rod moving unit using the controller;

a second connecting rod mounting step of mounting the connecting rod on the connecting rod moving unit by operating the connecting rod supply unit using the controller;

a second connecting rod supply step of supplying the connecting rod mounted on the connecting rod moving unit into the heating tube to be connected to the connecting rod supplied into the heating tube by operating the connecting rod moving unit using the controller;

a universal machine unit moving step of supplying a plurality of connecting rods into the heating tube to move the universal machine unit to a point where the foreign substances are located by sequentially performing the first connecting rod mounting step, the first connecting rod supply step, the second connecting rod mounting step, and the second connecting rod supply step;

an image-capturing unit moving step of moving the image-capturing unit to the point where the foreign substances are located through the heating tube; and a foreign substance removal step of removing the foreign substances using the universal machine unit while checking the image-capturing unit.

12. The method according to claim 11, wherein the universal machine unit comprises:
a first universal machine mounted on the distal end connecting rod positioned at a distal end of the connecting rod unit supplied into the heating tube; and
a second universal machine connected to the first universal machine and configured to be moved out of the heating tube through the opening formed in the heating tube to hold the foreign substances around the heating pipe.

13. The method according to claim 12, wherein the first universal machine comprises:
a first mounting body having, at one end thereof, a mounting end mounted on the distal end connecting rod to protrude therefrom;
a first servomotor provided in the first mounting body and connected to the controller;
a first planetary gear reducer connected to the first servomotor via a rotating shaft;
a first worm gear connected to the first planetary gear reducer; and
a first rotating finger connected to the first worm gear to rotate up and down by the operation of the first worm gear, and connected to the second universal machine,
wherein both ends of the distal end connecting rod are respectively provided with a connecting end, to which the mounting end is connected, and a connector end recess, in a protruding manner,
a connector end protrusion is connected to the connector end recess to protrude from one end of the connecting rod to which the end connecting rod is connected, and a connector end recess, to which the connector end protrusion is connected, is provided to protrude from the other end of the connecting rod.

14. The method according to claim 13, wherein the second universal machine comprises:
a second mounting body having a connecting end protruding outward from one end of the second mounting body to be connected to the first rotating finger, and a holding end protruding outward from the other end;
a second servomotor provided on one end side of the second mounting body and connected to the controller;
a second planetary gear reducer connected to the second servomotor via a rotating shaft;
a second worm gear connected to the second planetary gear reducer; and
a second rotating finger connected to the second worm gear to rotate up and down by the operation of the second worm gear, and operated in association with the holding end to hold the foreign substances.

15. The method according to claim 11, wherein the connecting rod moving unit comprises:
a first support frame mounted on a tube sheet of the steam generator and having a through-hole through which the connecting rod passes;
a second support frame provided to be spaced apart from the first support frame;
a plurality of connecting frames connecting the first support frame and the second support frame;
a vertical lifting body provided to be moved up and down between the first support frame and the second support frame and having a fastening member to fasten the connecting rod supplied from the connecting rod supply unit;
a guide rod provided between the first support frame and the second support frame to be connected to the lifting body to guide the movement of the lifting body; and
a lifting body moving part mounted on the second support frame to be connected to the lifting body to move up and down the lifting body from the guide rod.

16. The method according to claim 15, wherein the second support frame is provided with a through-hole through which the lifting body moving part passes, the lifting body moving part comprising:
a hydraulic rod connected to the lifting body to move up and down the lifting body during sliding movement thereof; and
a hydraulic motor connected to an end of the hydraulic rod to provide power to move the hydraulic rod.

17. The method according to claim 11, wherein the connecting rod supply unit comprises:
a connecting rod storage rotatably provided in the connecting rod moving unit to store a plurality of connecting rods, and having a plurality of seating recesses spaced apart from each other such that the stored connecting rods are seated therein;
a storage-rotary motor connected to the connecting rod storage to provide power to rotate the connecting rod storage in a circumferential direction;
a connecting rod supply provided inside the connecting rod storage to rotate and move the connecting rod seated in the plurality of seating recesses to a connecting rod insertion point of the connecting rod moving unit;
a supply-rotary motor connected to the connecting rod supply to rotate the connecting rod supply in the circumferential direction of the connecting rod storage; and
a mounting frame provided to be spaced apart from the connecting rod storage and connected to the connecting rod moving unit and having a mounting recess provided to mount the connecting rod moved in the connecting rod storage on the connecting rod insertion point,
wherein the connecting rod storage has a central hollow cylindrical shape, and the plurality of seating recesses are equidistantly formed to be spaced apart from each other in the circumferential direction of the connecting rod storage.

18. The method according to claim 17, wherein the connecting rod supply comprises:
- a supply-rotary rod provided inside the connecting rod storage to rotate with an external power source to detach the connecting rod seated in the seating recess and supply the same to the mounting recess of the mounting frame; and
- a rod-rotary unit connected to the supply-rotary rod to rotate the supply-rotary rod while moving up and down the supply-rotary rod in the connecting rod storage.

19. The method according to claim 18, wherein the supply-rotary rod is circumferentially provided with a plurality of seating protrusions for seating the connecting rod in the seating recess, and
when the supply-rotary rod is moved up by the rod-rotary unit, the connecting rod is seated in the seating recess, and when the supply-rotary rod is moved down, the connecting rod is detached from the seating recess.

20. The method according to claim 11, wherein the image-capturing unit comprises:
- an endoscope camera configured to move near the foreign substances through the mounting hole and capture an image thereof;
- a camera control part connected to the endoscope camera to control the operation of the endoscope camera; and
- a monitor part provided to allow a user to check the image captured by the endoscope camera.

* * * * *